(12) United States Patent
Teodosiu

(10) Patent No.: US 9,279,501 B2
(45) Date of Patent: Mar. 8, 2016

(54) SPLIT SEAL FOR A SHAFT

(71) Applicant: Dan Gabriel Teodosiu, Acton (CA)

(72) Inventor: Dan Gabriel Teodosiu, Acton (CA)

(73) Assignee: SKF USA INC., Lansdale, PA (US)

( * ) Notice: Subject to any disclaimer, the term of this patent is extended or adjusted under 35 U.S.C. 154(b) by 155 days.

(21) Appl. No.: 14/021,121

(22) Filed: Sep. 9, 2013

(65) Prior Publication Data

US 2015/0069717 A1 Mar. 12, 2015

(51) Int. Cl.
*F16J 15/32* (2006.01)
*F16J 15/447* (2006.01)

(52) U.S. Cl.
CPC .................................. *F16J 15/4474* (2013.01)

(58) Field of Classification Search
CPC .... F16J 15/447; F16J 15/4472; F16J 15/4474
See application file for complete search history.

(56) References Cited

U.S. PATENT DOCUMENTS

| 924,897 | A | * | 6/1909 | Emmet | 277/413 |
|---|---|---|---|---|---|
| 1,179,333 | A | * | 4/1916 | Obertop | 277/493 |
| 2,141,102 | A | | 12/1938 | Brooke | |
| 3,465,425 | A | * | 9/1969 | Leidenfrost | 29/527.7 |
| 4,575,098 | A | | 3/1986 | Escue | |
| 4,576,384 | A | | 3/1986 | Azibert | |
| 4,863,177 | A | | 9/1989 | Rockwood | |
| 5,362,072 | A | * | 11/1994 | Dalton | 277/413 |
| 6,142,479 | A | | 11/2000 | Fedorovich | |
| 6,334,619 | B1 | * | 1/2002 | Dietle et al. | 277/559 |
| 6,390,477 | B1 | * | 5/2002 | Drago et al. | 277/358 |
| 2007/0132192 | A1 | * | 6/2007 | Chevrette | 277/412 |

* cited by examiner

*Primary Examiner* — Gilbert Lee
(74) *Attorney, Agent, or Firm* — J-TEK Law PLLC; Jeffrey D. Tekanic; Scott T. Wakeman

(57) ABSTRACT

A shaft seal includes first and second rings, each formed from first and second discrete arc segments, mounted on a shaft. The first ring includes a central opening and a flange projecting axially away from a first axial surface of the first ring around the central opening, and the flange has a radially outer surface. The second ring has a radial inner face defining a central opening that includes a first portion extending from a first axial face of the second ring and a second portion extending from a second axial face of the second ring, and the second ring is mounted to the first ring with the second portion in contact with the radially outer surface of the flange. A plurality of fasteners extend from the second ring into an axial surface of the first ring or from the first ring into an axial face of the second ring.

19 Claims, 6 Drawing Sheets

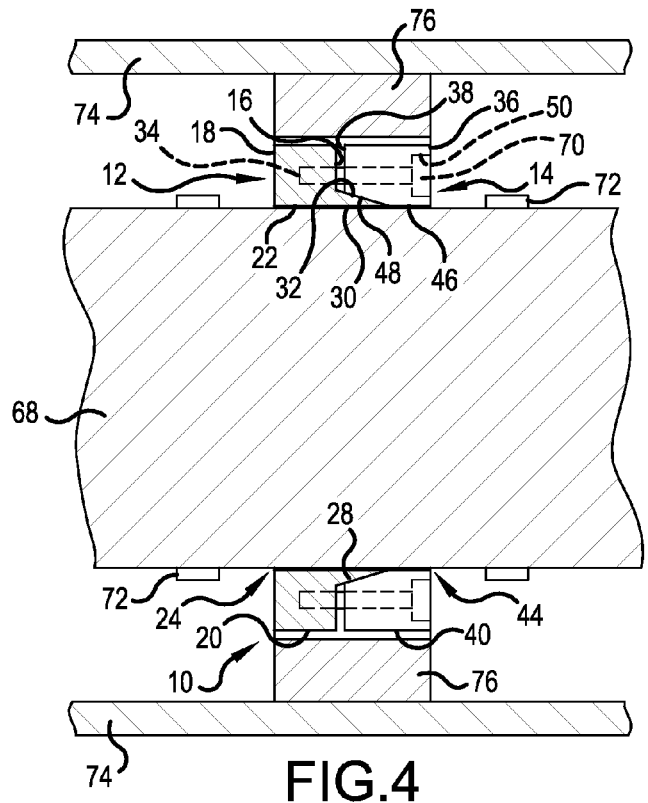
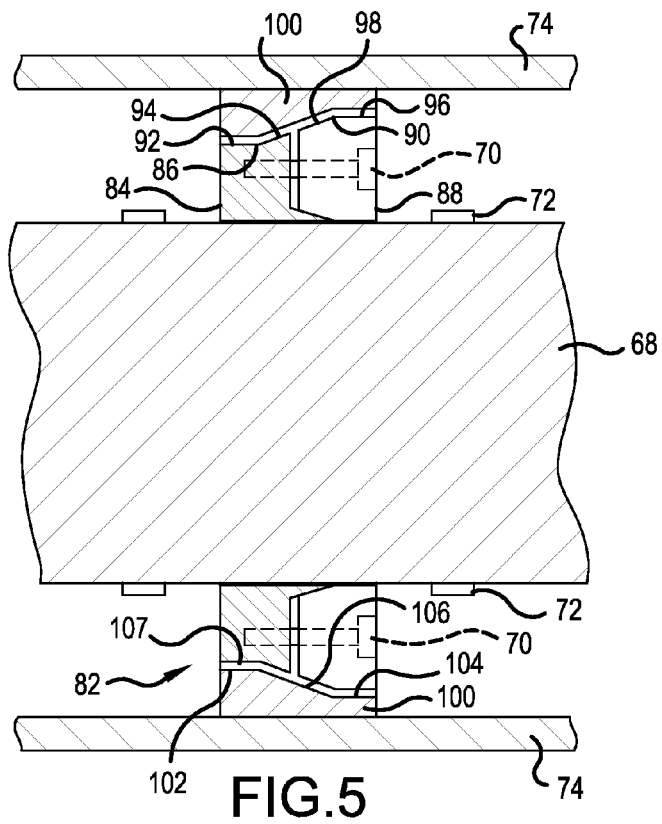

SPLIT SEAL FOR A SHAFT

FIELD OF THE INVENTION

The present invention is directed to a split seal for a shaft, and more specifically, to a split seal for a shaft which seal includes first and second two-part rings connected by fasteners that are configured to pull the first and second ring together in an axial direction.

BACKGROUND

Shaft seals are known that are mountable on stationary or rotatable shafts to prevent or substantially prevent or controllably allow the flow of a fluid from one side of the seal to the other. Such seals may include radially inner and radially outer seal members that rotate relative to each other with little or no space therebetween to provide the sealing function. The outer surface of the inner seal member and the inner surface of the outer seal member may be substantially cylindrical or, alternately, may have complementary non-cylindrical shapes. As an example, the inner seal member may have one or more annular ridges that is/are received within corresponding grooves on the outer member. Such seals may be referred to as "labyrinth seals" and provide a labyrinthine pathway to affect the rate at which a fluid can move from one side of the seal to the other.

Shaft seals may be mounted at an end of a shaft or in the middle of a shaft with or without other elements being present between the seal and an end of the shaft. When the inner and outer seal members are each formed as unitary rings, the seal elements must be mounted on the shaft axially by passing them over one end of the shaft and moving them to a desired location. When it becomes necessary to remove such seals for inspection, repair or replacement, however, all elements between the seal member and the end of the shaft must be removed to allow the axial removal of the seal member. Certain types of labyrinth seals may also be difficult to assemble or disassemble without significantly stretching the outer seal member to allow it to fit over projections on the inner seal member.

Some of these problems may be addressed by split seals. In a split seal, the inner ring member, the outer ring member, or both are formed from generally cylindrical members that are split in half. Thus, rather than sliding these seals axially over the end of a shaft during installation, they can be placed radially on either side of a shaft at a desired location and moved toward one another and joined. This joining may be accomplished, for example, by screws or other fasteners screwed into the seal member from a radially inner or radially outer surface, the screws extending either radially or along a chord of the circular cross section of the seal. However, in some installations, it may be difficult to access the fasteners that hold the two halves of the seal member together. It would therefore be desirable to provide a split shaft seal in which multiple components of the seal are held together with easily accessible fasteners.

SUMMARY

These and other problems are addressed by the present invention, a first aspect of which comprises a shaft seal having first and second rings mountable on a shaft. The first ring has a first axial surface, a second axial surface, a radial outer surface, a radial inner surface defining a central opening and surrounding a first ring central axis, and a flange projecting axially away from the first axial surface around the central opening. The flange has a radially outer surface extending away from the first axial surface and toward the first ring central axis, and the first ring is formed from first and second discrete arc segments. The second ring has a first axial face, a second axial face, a radial outer face, and a radial inner face defining a central opening and surrounding a second ring central axis. The radial inner face comprises a first portion extending from the first axial face and a second portion extending from the second axial face, and the second ring is formed from first and discrete second arc segments. The second ring is mounted to the first ring with the second portion in contact with the radially outer surface of the flange. The shaft seal also includes a plurality of fasteners extending from the second ring into the first axial surface of the first ring or from the first ring into the second axial face of the second ring and securing the first ring to the second ring.

Another aspect of the invention comprises a shaft seal that includes first and second generally C-shaped seal segments each having first and second ends, the first and second seal segments being positioned with the first end of the first seal segment aligned with the first end of the second seal segment at a first junction to form a first ring. The shaft seal also includes third and fourth generally C-shaped seal segments each having first and second ends, the third and fourth seal segments being positioned with the first end of the third seal segment aligned with the first end of the fourth seal segment at a second junction to form a second ring. The first ring is axially connected to the second ring with the first junction angularly offset from the second junction.

Another aspect of the invention comprises a shaft seal that includes a shaft having a longitudinal axis and a radially outer wall. The shaft seal also includes a first ring mounted on the radially outer wall of the shaft that has a first axial surface, a second axial surface, a radial outer surface, a radial inner surface defining a central opening, and a flange projecting axially away from the first axial surface around the central opening. The flange has a radially outer surface extending away from the first axial surface and toward the shaft, and the first ring is formed from first and second discrete arc segments. The shaft seal also includes a second ring mounted on the radially outer wall of the shaft, and the second ring has a first axial face, a second axial face, a radial outer face, and a radial inner face defining a central opening. The radial inner face comprises a substantially cylindrical portion extending from the first axial face and a bevel portion extending from the second axial face, and the second ring is formed from first and second discrete arc segments. The bevel portion is mounted to the radially outer surface of the flange. A plurality of threaded fasteners connect the first ring to the second ring. These fasteners are configured to pull the first ring and second ring axially toward one another when the plurality of fasteners are tightened. The shaft seal is configured such that tightening the plurality of fasteners causes the bevel to compress the flange against the shaft to secure the first and second ring to the shaft.

BRIEF DESCRIPTION OF THE DRAWINGS

These and other features and aspects of the present invention will be better understood after a reading of the following detailed description together with the attached drawings, wherein:

FIG. 4 is a sectional elevational view of the shaft seal of FIG. 1 mounted on a shaft inside an outer seal in a housing.

FIG. 5 is a sectional side elevational view of a shaft seal according to a second embodiment of the invention mounted on a shaft inside an outer seal in a housing.

DETAILED DESCRIPTION

Figure 1:
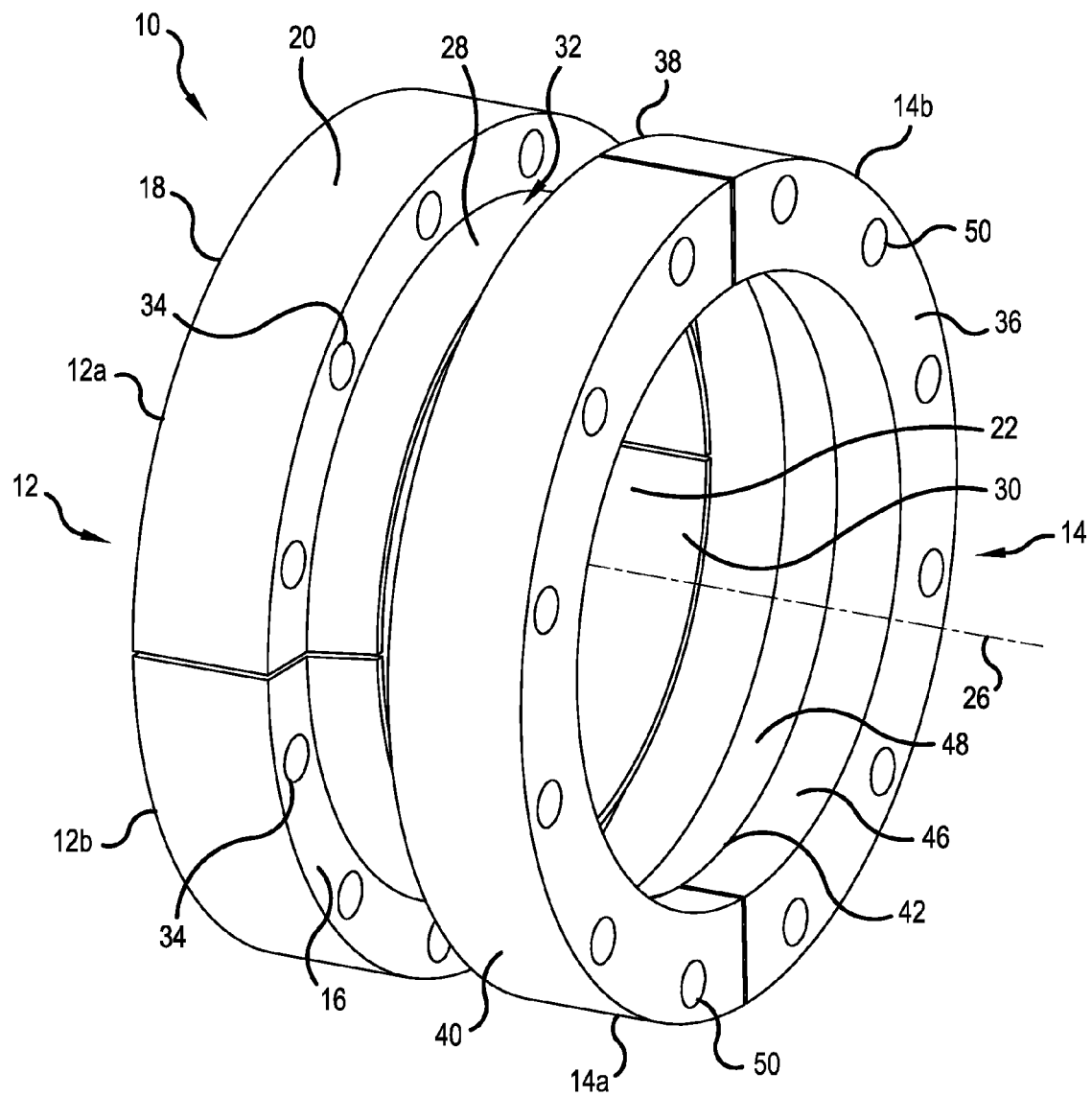
FIG. 1 is perspective view of a shaft seal according to a first embodiment of the present invention having a first ring and a second ring.

Referring now to the drawings, wherein the showings are for purposes of illustrating presently preferred embodiments of the invention only and not for the purpose of limiting same, FIG. 1 shows a shaft seal 10 comprising a first ring 12 formed from a first arc segment 12a and a second arc segment 12b and a second ring 14 formed from a third arc segment 14a and a fourth arc segment 14b. In the following discussion, reference numerals 12 and 14 are used to refer to the first and second rings, respectively, in their entireties, and the suffixes "a" and "b" are used to refer to specific ones of the discrete arc segments that form the first and second rings 12, 14. That is, ring 12 will be referred to as a "ring" even though it is formed of two discrete parts 12a, 12b that are not joined to each other at all times during the assembly of the seal 10 to a shaft. Furthermore, each of the first and second rings 12, 14 includes two arc segments; however, the arc segments 14a, 14b of the second ring 14 may be referred to herein as "third" and "fourth" arc segments to more clearly distinguish them from the first and second arc segments 12a, 12b of the first ring 12.

The first ring 12 includes a first axial surface 16 and a second axial surface 18 parallel to and spaced from the first axial surface 16, and both the first axial surface 16 and the second axial surface 18 are substantially annular. The first ring 12 further includes a radially outer surface 20 and a radially inner surface 22 that bounds or defines a central opening 24 through the first ring 12, the central opening 24 having an axial centerline 26. A flange 28 extends in an axial direction away from the first axial surface 16 near and surrounding the central opening 24, and the flange 28 includes a generally cylindrical radially inner wall 30 and a radially outer wall 32 that is angled from the first axial surface 16 toward the center axis 26 of the first ring 12. The first ring 12 further includes a plurality of axial openings 34, which may include internal threads (not illustrated), in the first axial surface disposed radially between the flange 28 and the radially outer surface 20.

The second ring 14 includes a first axial face 36 and a second axial face 38 spaced from and generally parallel to the first axial face 36, the first and second axial faces 36, 38 each being generally annular. The second ring 14 also includes a radially outer face 40 and a radially inner face 42 that bounds or defines a central opening 44 in the second ring 14. The radially inner face 42 includes a first circumferential portion 46 extending axially inwardly from the first axial face 36 that is generally cylindrical and a second circumferential portion 48 extending axially inwardly from the second axial face 38 that is beveled and is not coplanar with or parallel to the first circumferential portion 46. The slope of the second circumferential portion 48 relative to the centerline 26 is about the same as the slope of the radial outer wall 32 of the flange 28 relative to the axial centerline 26. The second ring 14 further includes a plurality of axial openings 50 which may include internal threads (not illustrated), in the first axial face 36 disposed radially between the central opening 44 of the second ring 14 and its radially outer face 40.

Figure 2:
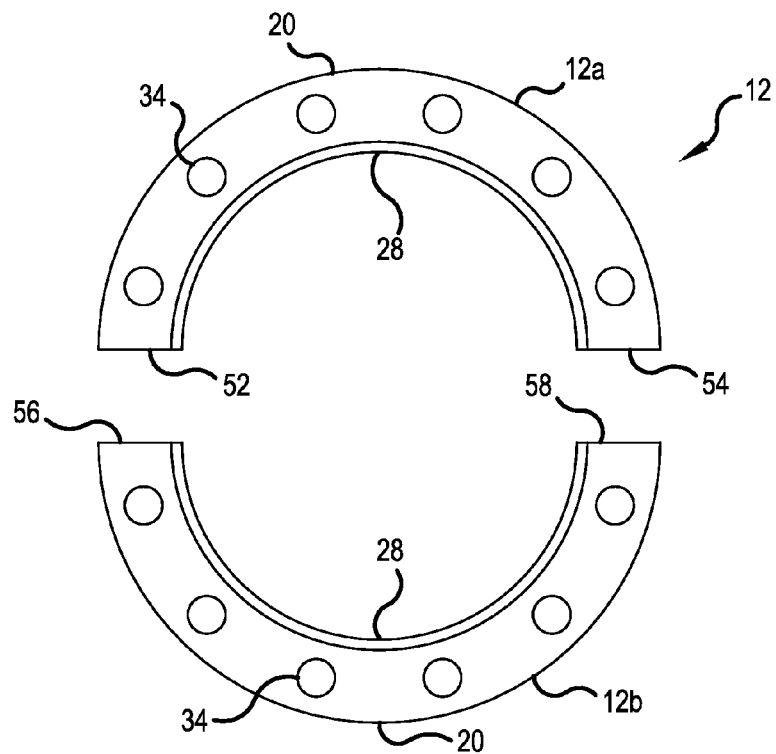
FIG. 2 is a side elevational view of the first ring of FIG. 1.
Figure 3:
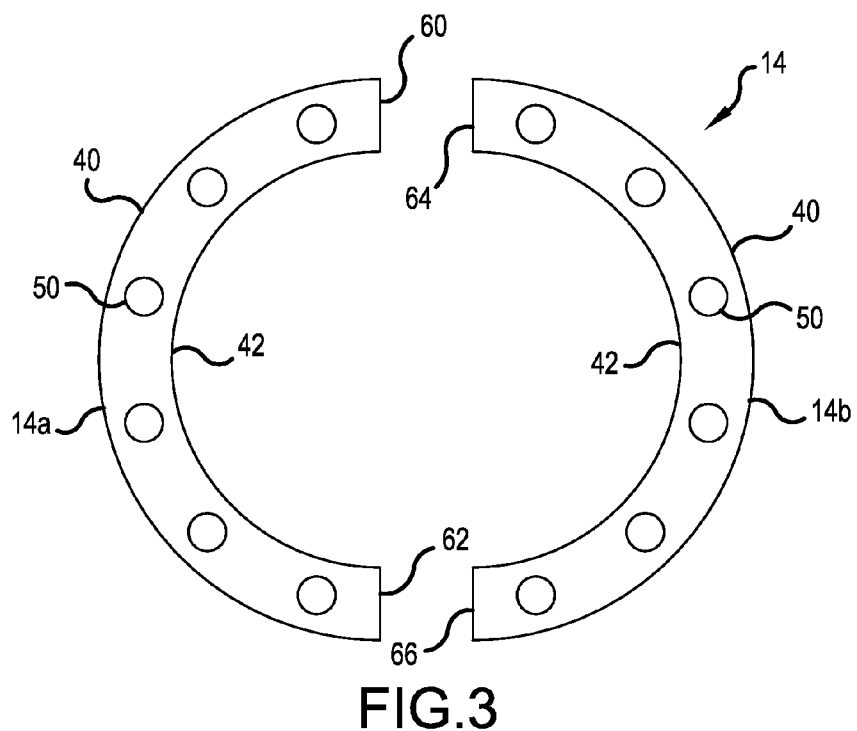
FIG. 3 is a side elevational view of the second ring of FIG. 1.

The first arc segment 12a and second arc segment 12b of the first ring 12 each have an angular extent of about 180 degrees, and the sum of the arcs or angles of the first arc segment 12a and the second arc segment 12b is about 360 degrees. Referring now to FIGS. 2 and 3, the first arc segment 12a includes a first end face 52 and a second end face 54 lying substantially in a single plane, and the second arc segment 12b includes a first end face 56 and a second end face 58 that also lie substantially in one plane. The third arc segment 14a and the fourth arc segment 14b of the second ring 14 also each comprise an arc of about 180 degrees, and the sum of the arcs of the third arc segment 14a and the fourth arc segment 14b is about 360 degrees. The third arc segment 14a includes a first end face 60 and a second end face 62 lying substantially in a plane, and the fourth arc segment 14b includes a first end face 64 and a second end face 66 that also lie substantially in a plane.

As discussed below, in use, the arc segments are placed onto a cylindrical shaft, and thus cannot extend substantially more than 180 degrees and still fit onto the shaft. Depending on the intended tolerances between the ring and the shaft, one of the arc segments might extend slightly more than 180 degrees and the other slightly less than 180 degrees. Moreover, in view of the attachment arrangement discussed below, the sum of the arcs of the first and second arc segments 12a, 12b and of the third and fourth arc segments 14a, 14b, could be slightly less than 360 degrees and still essentially form the first and second rings 12, 14. In practice, both the first arc segment 12a and the second arc segment 12b are substantially semicircular in cross section and will be described as such even when the angular extent of the ring segments is not exactly 180 degrees and/or the sum of the respective pairs of arc segments is not exactly 360 degrees.

The attachment of the first and second rings 12, 14 to a shaft 68, illustrated in FIG. 4, is described hereinafter. It should be noted in connection with this and other descriptions herein that relative directional terms such as "top" and "bottom" are used to describe elements of embodiments of the invention with respect to their orientation in the drawings. Embodiments of the invention can be placed in different orientations during use so that, for example, an element referred to as a "top" element may actually be located below an element described as a "bottom" element. These relative terms are therefore used for ease of description and are not intended to limit the invention to use in any particular orientation.

The first arc segment 12a and second arc segment 12b of the first ring 12 are placed on opposite sides of the shaft 68 so that the first end face 52 of the first arc segment 12a faces the first end face 56 of the second arc segment 12b and so that the second end face 54 of the first arc segment 12a faces the second end face 58 of the first arc segment 12a. The respective end faces may be in contact with adjacent end faces or held in a closely spaced relationship therewith. For purposes of discussion, it will be assumed that the first and second end faces 52, 54 of the first arc segment 12a are positioned in a horizontal plane so that the gaps or junctions between the first arc segment 12a and the second arc segment 12b are located at the left and right sides of the ring 12. Next, the third arc segment 14a is positioned with its first end face 60 and second end face 62 generally in a vertical plane and it is placed against the first arc segment 12a, and the second arc segment 12b in a partially overlapping manner such that the openings 50 in the third arc segment 14a are aligned with the openings 34 in the first arc segment 12a and the second arc segment 12b and so that the radially outer face 40 of the third arc segment 14a is generally aligned with a portion of the radial outer surface 20 of the first ring 12. Threaded fasteners 70 are inserted through the openings 50 in the third arc segment 14a and into the openings 34 in the first and second arc segments 12a, 12b and tightened to loosely secure the third arc segment 14a to the first and second arc segments 12a, 12b. The fourth arc segment 14b is then positioned with its first end face 64 facing the first end face 60 of the third arc segment 14a and its second end face 66 facing the second end face 62 of the third arc segment 14a and connected to the first and second arc segments 12a, 12b using additional fasteners 70 inserted through the openings 50 in the fourth arc segment 14b and into the openings 34 in the first and second arc segments 12a, 12b. Other mechanical fasteners, such as nuts and bolts or various clamps, such as "c" and toggle clamps, could alternately be used to pull the first ring 12 and second ring 14 axially toward one another and secure them in position.

In this configuration, at least a portion of the second circumferential portion 48 of the radially inner face 42 of the second ring 14 is in contact with and/or partially supported by the radially outer wall 32 of the flange 28, and the interconnected first and second rings 12, 14 can be slid axially along the shaft 68. When the first and second rings 12, 14, which together form the shaft seal 10, are in a desired location on the shaft 68, the fasteners 70 are tightened to draw the first ring 12 and second ring 14 together in an axially direction. As will be appreciated from FIG. 4, this tightening of the fasteners 70 forces the second circumferential portion 48 of the radially inner face 42 along the slope of the outer wall 32 of the flange 28 and compresses the inner wall 30 of the flange 28 against the shaft 68. The fasteners 70 are tightened sufficiently to secure the shaft seal 10 on the shaft 68. This arrangement also allows the shaft seal 10 to be mounted on and removed from shaft 68 even if the shaft is supported at both ends and/or in the presence of other structures 72, on the shaft adjacent to the shaft seal 10, which would interfere with the axial removal of a conventional shaft seal.

Figure 8:
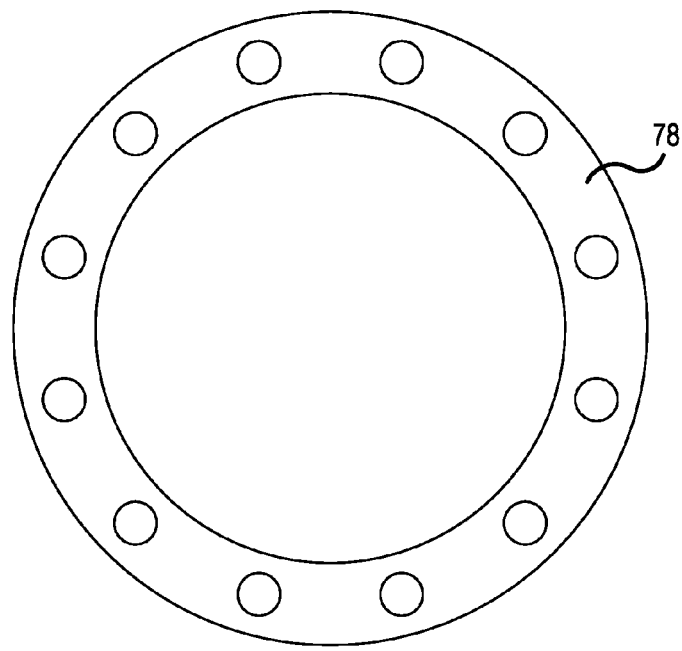
FIG. 8 is a side elevational view of a unitary outer seal.
Figure 9:
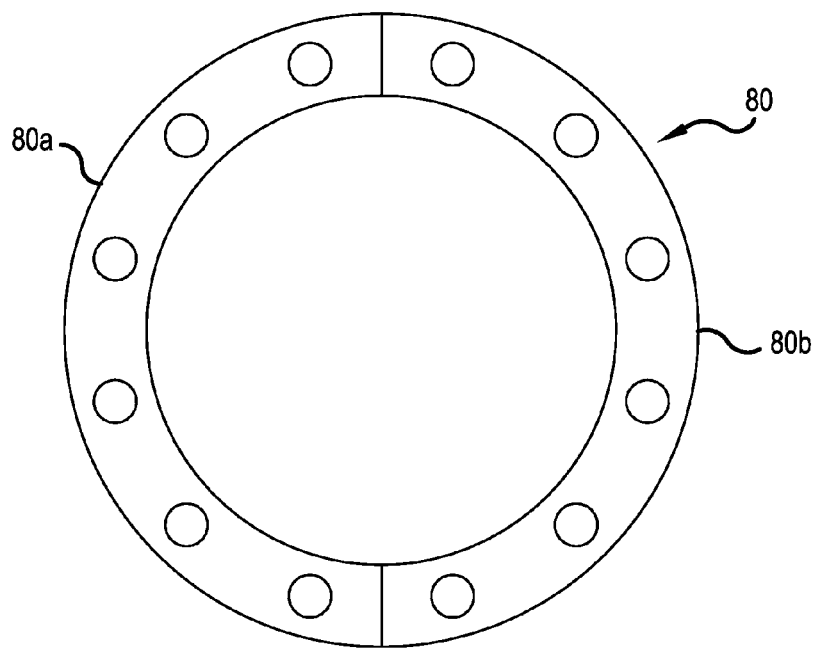
FIG. 9 is a side elevational view of a two-piece outer seal.

The shaft seal 10 may be mounted in a housing 74 to provide a fluid-tight or controlled leakage seal with the housing 74 while the shaft 68 rotates relative to the housing 74 (and/or the housing 74 rotates relative to the shaft 68). The interface between the radially inner wall 30 of the flange 28 and the shaft 68 substantially prevents fluid from flowing past the shaft seal 10 along the shaft 68, and the angular offset between the junctions of the first and second arc segments 12a, 12b and the junctions of the third and fourth arc segments 14a, 14b substantially prevents leakage through these junctions, even if the opposed pairs of end faces of the arc segments that form a given ring 12, 14 have a small gap therebetween. Alternately, the shaft seal 10 may be mounted within an outer seal 76 in the housing 74. FIG. 4 illustrates the shaft 68 supporting the shaft seal 10 mounted in a housing 74 and an outer seal member 76 closely spaced from the shaft seal 10. As illustrated in FIG. 8, the outer seal may comprise a unitary element 78 or, as illustrated in FIG. 9, a split seal 80 comprising a fifth arc segment 80a and a second arc segment 80b. The outer seal 78 or 80 may but does not need to have axial openings as illustrated and will generally be attached to the housing 74 by radially extending fasteners. A sealant may be used, as necessary, to prevent leakage through the outer seal member 76, 78 or 80.

FIG. 5 shows a shaft seal 82 according to a second embodiment of the present invention. In this drawing figure, the shaft seal 82 is generally similar to the shaft seal 10 illustrated in FIGS. 1 and 4 and attaches to shaft 68 in the same manner as the shaft seal 10. However, the first ring 84 of the shaft seal 82 has a radially outer surface 86 that is different than the radially outer surface 20 of the first ring 12, and the second ring 88 has a radially outer face 90 that is different than the radially outer face of the second ring 14. Elements discussed above in connection with the first embodiment which are also present in the second embodiment are identified herein using like reference numerals and/or are not described in detail.

The outer surface 86 of the first ring 84 has a cylindrical portion 92 on a side away from the second ring 88 and a first angled surface 94 extending away from the cylindrical portion 92 and away from the shaft 68. The outer face 90 of the second ring 88 includes a cylindrical portion 96 extending from the side of the second ring 88 spaced from the first ring 84 and a second angled surface 98 extending from the cylindrical portion 96 of the outer face 90 toward the first ring 84 and toward the shaft 68. The slope of the first angled surface 94 is substantially the same as the slope of the second angled surface 98, and together the first and second angled surfaces 94, 98 form an angled outer surface of the shaft seal 82. In this embodiment, the housing 74 is provided with an outer seal 100 that includes first and second axially spaced cylindrical portions 102, 104 intended to align with the cylindrical portion 92 of the first ring 84 and the cylindrical portion 96 of the second ring 88 and a central angled portion 106 configured to align with the first and second angled surfaces 94, 98. In other words, the shape of the outer seal 100 is conformed to or complementary to the shape of the shaft seal 82 but is spaced therefrom by a small gap 107. The size of the gap 107 and the angle of the central angled portion 106 are selected to allow a controlled amount of fluid to move both axially and radially between the shaft seal 82 and the outer seal 100.

Figure 6:
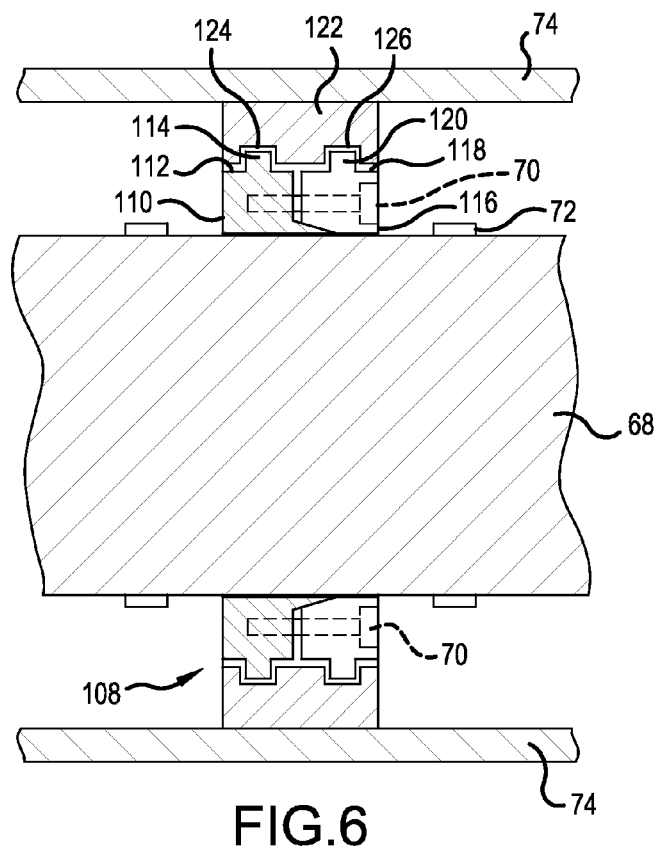
FIG. 6 is a sectional side elevational view of a shaft seal according to a third embodiment of the invention mounted on a shaft inside an outer seal in a housing.
Figure 7:
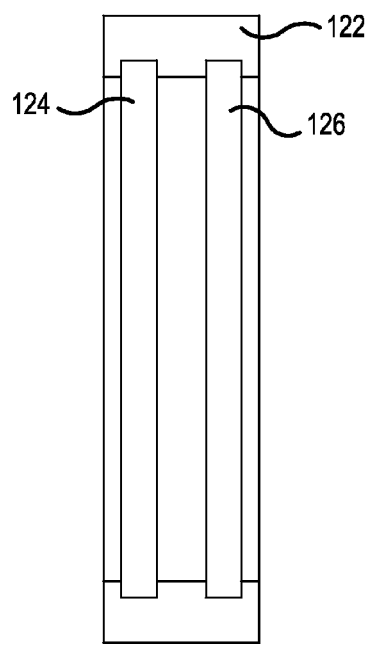
FIG. 7 is a side elevational view of one half of the outer seal of FIG. 6.

FIG. 6 shows a shaft seal 108 according to a third embodiment of the present invention. The shaft seal 108 is substantially identical the shaft seals 10, 82 of the previous embodiments and differs only in the construction of its outer wall. The following discussion therefore focuses only on this difference. The shaft seal 108 includes a first ring 110 having a radially outer surface 112 with a first annular ridge 114 and a second ring 116 having a radially outer face 118 having a second annular ridge 120. The shaft seal 108 is mounted in the housing 74 radially inside an outer seal 122 that includes a first annular groove 124 and a second annular groove 126 for receiving the first and second annular ridges 114, 120, respectively, which groves 124, 126 are also illustrated in FIG. 7. This configuration provides a labyrinthine path from one side of the seal to the other that passes around each of the first and second annular ridges 114, 120. Such an outer seal 122 is preferably formed as two pieces to allow placement on the shaft seal 108 with the first and second ridges 114, 120 of the shaft seal 82 in the first and second grooves 124, 126 without the need to substantially deform the outer seal as would be required to move a unitary outer seal onto such a shaft seal.

Figure 10:
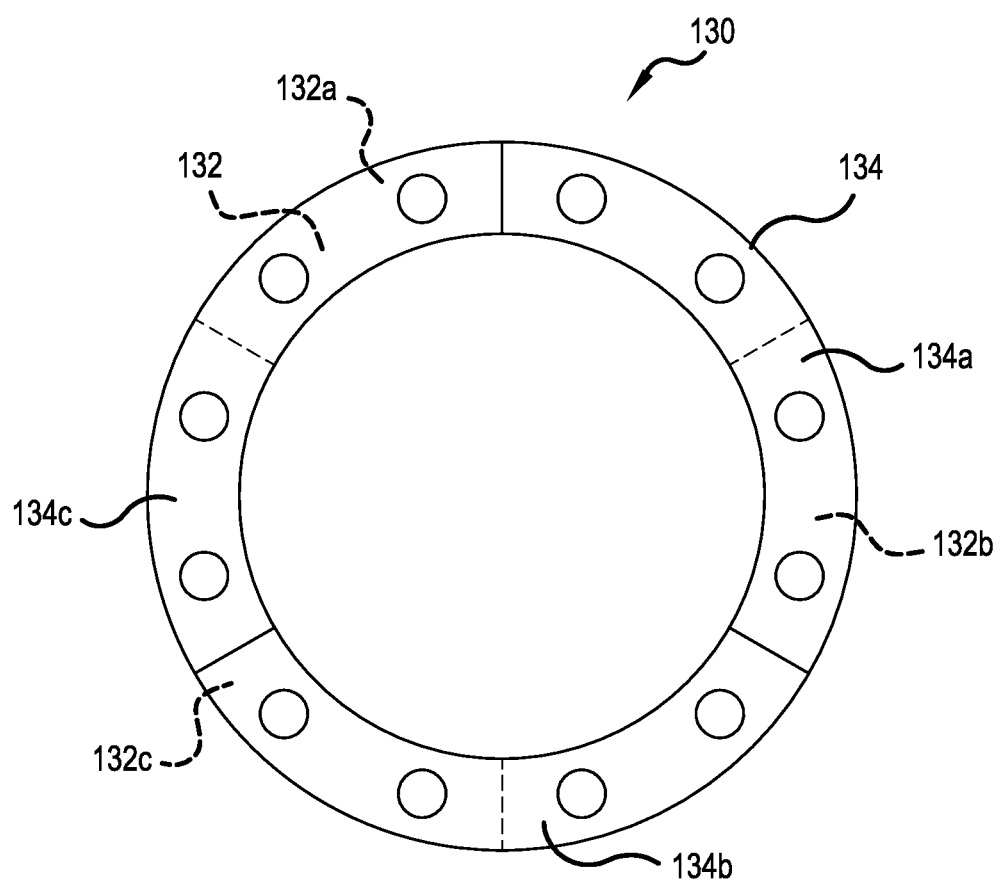
FIG. 10 is a side elevational view of a shaft seal according to a fourth embodiment of the present invention.

As a variation on any of the foregoing embodiments, any of the first rings, second rings and/or outer rings can be formed from more than two arc segments. FIG. 10, for example, illustrates a shaft seal 130 that includes a first ring 132 substantially hidden by a second ring 134. The first ring 132 has three arc segments 132a, 132b, 132c each of which has an angular extent of approximately 120 degrees, and the second ring 134 has three arc segments 134a, 134b, 134c, each of which also has an angular extent of about 120 degrees. The first ring 132 is mounted to the second ring 134 such that the junctions between the arc segments 132a, 132b and 132c of the first ring 132 are angularly offset from the junctions between the arc segments 134a, 134b, 134c of the second ring 134. When rings having more than two arc segments are provided, the arc segments can have the same or different angular extent; that is, all three or more arc segments do not have to be identical.

The present invention has been described herein in terms of presently preferred embodiments. Modifications and additions to these embodiments may become apparent to persons of ordinary skill in the art upon a reading of the foregoing description. It is intended that all such modifications and additions form a part of the present invention to the extent they fall within the scope of the several claims appended hereto.

What is claimed is:

1. A shaft seal comprising first and second rings mountable on a shaft,
   the first ring having a first axial surface, a second axial surface, a radial outer surface, a radial inner surface defining a central opening and surrounding a first ring central axis, and a flange projecting axially away from the first axial surface around the central opening, the flange having a radially outer surface extending away from the first axial surface and toward the first ring central axis, the first ring being formed from first and second discrete arc segments;
   the second ring having a first axial face, a second axial face, a radial outer face, a radial inner face defining a central opening and surrounding a second ring central axis, the radial inner face comprising a first portion extending from the first axial face and a second portion extending from the second axial face, the second ring being formed from first and discrete second arc segments, the second ring being mounted to the first ring with the second portion in contact with the radially outer surface of the flange; and
   the shaft seal including a plurality of fasteners extending from the second ring into the first axial surface of the first ring or from the first ring into the second axial face of the second ring and securing the first ring to the second ring.

2. The shaft seal according to claim 1, wherein the first portion of the radially inner face is substantially cylindrical and the second portion of the radially inner face comprises a bevel.

3. The shaft seal according to claim 1, wherein the shaft seal is shiftable between a first configuration and a second configuration, wherein in the first configuration, the first ring and second ring are spaced by a first gap having a first width, and wherein in the second configuration, the first ring and the second ring are separated by a second gap having a second width less than the first width or wherein the first axial surface is in contact with the second axial face.

4. The shaft seal according to claim 1, wherein the first and second arc segments of the first ring are semicircular.

5. The shaft seal according to claim 4, wherein the first and second arc segments of the second ring are semicircular.

6. The shaft seal according to claim 1, wherein the first ring comprises a third arc segment.

7. The shaft seal according to claim 1, wherein the first ring segment of the first ring is connected to the second ring segment of the first ring only by the first and second ring segments of the second ring and a first subset of the plurality of fasteners and wherein the first ring segment of the second ring is connected to the second ring segment of the second ring only by the first and second ring segments of the first ring and a second subset of the plurality of fasteners.

8. The shaft seal according to claim 1, wherein the first and second rings comprise an inner seal and including an outer seal having a radially inner surface radially spaced from the radially outer face and from the radially outer surface.

9. The shaft seal according to claim 8, wherein the outer seal comprises first and second discrete arc segments.

10. The shaft seal according to claim 8, wherein the radially outer surface and the radially outer face are substantially cylindrical.

11. The shaft seal according to claim 8, wherein at least one of the radially outer surface and the radially outer face is angled relative to the first ring central axis.

12. The shaft seal according to claim 8, wherein at least one of the radially outer surface and the radially outer face includes a circumferentially extending ridge.

13. The shaft seal according to claim 8, wherein the radially inner surface of the outer seal includes first and second circumferential grooves, wherein the outer surface includes a first circumferential ridge in the first groove and the radially outer face includes a second circumferential ridge in the second groove.

14. The shaft seal according to claim 1, wherein a junction between the first and second arc segments of the first ring is circumferentially offset from a junction between the first and second arc segments of the second ring.

15. The shaft seal according to claim 1, wherein a junction between the first and second arc segments of the first ring is circumferentially offset from a junction between the first and second arc segments of the second ring by about ninety degrees.

16. A shaft seal comprising:
   a shaft having a longitudinal axis and a radially outer wall;
   a first ring mounted on the radially outer wall of the shaft and having a first axial surface, a second axial surface, a radial outer surface, a radial inner surface defining a central opening, and a flange projecting axially away from the first axial surface around the central opening, the flange having a radially outer surface extending away from the first axial surface and toward the shaft, the first ring being formed from first and second discrete arc segments;
   a second ring mounted on the radially outer wall of the shaft, the second ring having a first axial face, a second axial face, a radial outer face, a radial inner face defining a central opening, the radial inner face comprising a substantially cylindrical portion extending from the first axial face and a bevel portion extending from the second axial face, the second ring being formed from first and second discrete arc segments, the bevel portion mounted to the radially outer surface of the flange;
   a plurality of threaded fasteners connecting the first ring to the second ring, the plurality of threaded fasteners configured to pull the first ring and second ring axially toward one another when the plurality of fasteners are tightened and the shaft seal being configured such that tightening the plurality of fasteners causes the bevel to compress the flange against the shaft to secure the first and second ring to the shaft.

17. The shaft seal according to claim 16, wherein the first ring and the second ring comprise an inner seal and including an outer seal surrounding and radially spaced from the inner seal.

18. The shaft seal according to claim 17, wherein at least one of the radially outer surface of the first ring and the radially outer face of the second ring is non-cylindrical and wherein the outer seal has a radially inner surface complementary to the radially outer surface and the radially outer face.

19. The shaft seal according to claim 16, wherein a junction between the first and second arc segments of the first ring is circumferentially offset from a junction between the first and second arc segments of the second ring by about ninety degrees.

* * * * *